Aug. 28, 1956                    M. P. LAURENT                    2,760,673
                               SEAL FOR VACUUM VESSELS
                                 Filed April 27, 1955
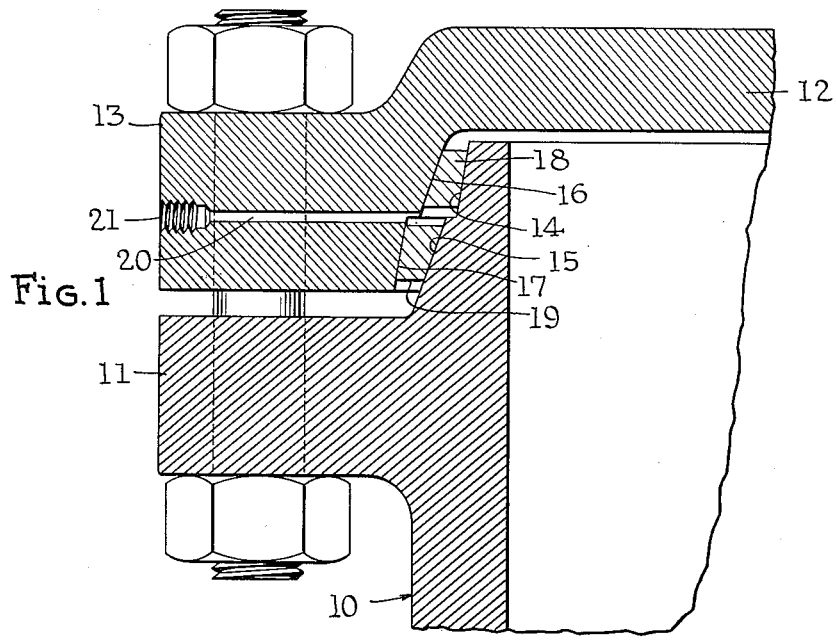
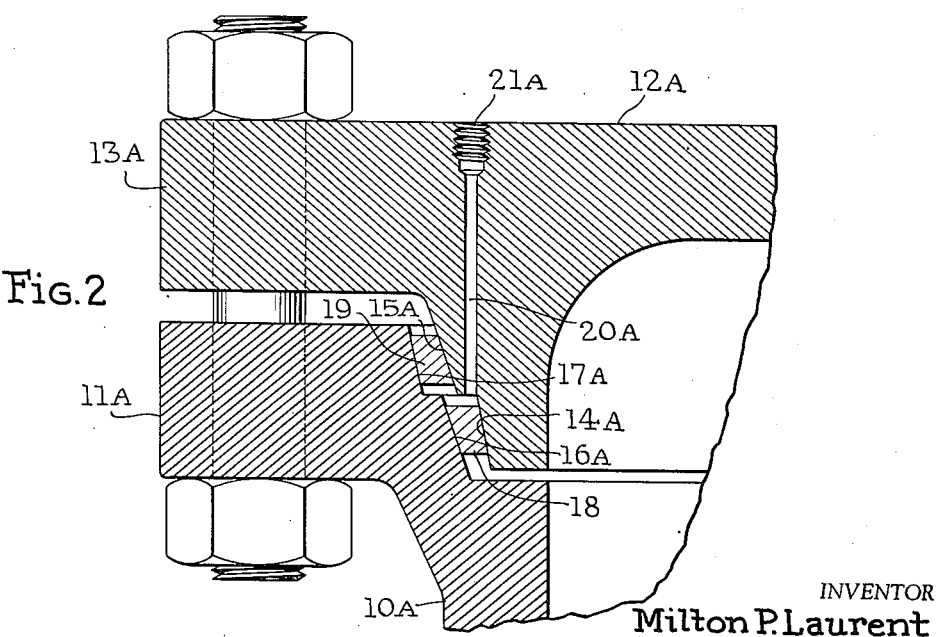
INVENTOR
Milton P. Laurent
BY  Kenon and Palmer
ATTORNEYS

2,760,673
SEAL FOR VACUUM VESSELS

Milton Paul Laurent, Houston, Tex.; Frank A. Rudman, John J. Roach, and Ruby Sandoz Laurent, executors of said Milton Paul Laurent, deceased Application April 27, 1955, Serial No. 504,258

4 Claims. (Cl. 220—46)

This invention relates to pressure-sealed joints, and more particularly to pressure-sealed joints for large diameter, high temperature vessels, which are intended to operate at low pressures, at one point of an operating cycle, and under a vacuum of less than atmospheric pressure at another point in the operating cycle.

The chemical industry has long been faced with the problem of providing a satisfactory seal for apparatus operating under these pressure conditions. Such seals are difficult to form and also difficult to maintain, because the initial seal must be formed by mechanical loading on the joint proper, with no additional sealing effect to be derived from pressures within the vessel.

Accordingly, it is the principal object of this invention to provide a seal for closure members of vessels operating at high temperatures and in which the internal pressures range from a vacuum or sub-atmospheric pressures to low pressure values.

A complete understanding of the present invention may be had by reference to the following description, taken in conjunction with the attached sheet of drawing, in which:

Figure 1 is a side elevational view of a portion of a joint embodying the present invention, and Figure 2 is a similar view showing a modification.

Referring now to Figure 1, the vessel 10 includes an annular flange 11. The closure member 12 includes a similar flange 13 so that the closure may be assembled on the vessel in any convenient manner, as for example, by means of the bolted connection shown in the drawing. The vessel further includes a pair of convex conoidal sealing surfaces 14 and 15, and the closure member includes a related pair of concave conoidal sealing surfaces 16 and 17. With the closure assembled on the vessel, as shown in Figure 1, the closure and vessel are separated at the related sealing surfaces by a pair of annular sealing rings 18 and 19. The sealing surfaces of the rings are designed to mate with the sealing surfaces of the vessel and closure member. The rings may be formed of any substantially rigid material. An elastic metal such as steel, copper or aluminum is preferred but certain plastic materials such as nylon or teflon could also be used.

As shown in Figure 1, the closure member 12 is further provided with a radially extending channel or duct 20, the inner end of which terminates, with the joint parts in assembled relation, in the space between the bases of the two annular sealing rings 18 and 19. The outer end of the duct 20 may conveniently terminate in a threaded fitting 21, affording connection of an external source of fluid pressure.

In the embodiment shown in Figure 2, the joint is substantially the same. Corresponding parts are given the same reference numerals as in Figure 1 with the addition of the letter "A." The principal difference lies in the fact that the relative positions of the convex and concave conoidal surfaces are reversed. The closure member in this instance fits inside the vessel opening, whereas in Figure 1 it overlies the vessel opening. The closure member in this instance includes the convex conoidal sealing surfaces, and the vessel itself includes the concave conoidal sealing surfaces. The principle of operation in each case, however, is the same.

In each of the two embodiments shown, the same relation between the pairs of the vessel and closure sealing surfaces holds. This relation may be defined in various ways, but perhaps is best defined as follows: The concave conoidal surface in each case conforms substantially to an imaginary surface which would be generated by the periphery of the sealing ring if the sealing ring, while encircling the convex conoidal surface, is forced toward the base thereof. So long as this relationship holds, it will be apparent that regardless of the position of the rings on the sealing surfaces, sealing contact will be maintained between inner and outer surfaces of the ring and the sealing surfaces upon the vessel and closure member.

In operation, therefore, fluid pressure is introduced through the duct in the closure member into the space between the two sealing rings. As long as this pressure is higher than that which exists interiorly of the vessels, the two rings will be forced away from each other and into complementary annular intervals which narrow in the direction in which the externally applied fluid pressure acts. This will result in a gas-tight seal along all sealing surfaces regardless of variations in temperature and, therefore, physical dimensions of the respective joint components.

Variations of the specific embodiments shown are contemplated within the scope of the appended claims.

I claim:

1. A pressure sealed joint for a hollow vessel comprising: said vessel; a closure for said vessel; means for holding said closure in spaced relation to the vessel opening; means affording a pair of adjacent connected intervals between said closure and said vesesl, one of said intervals narrowing outwardly of the vessel opening and the other of said intervals narrowing inwardly of the vessel opening, said means including related pairs of conoidal seal surfaces on the vessel and closure member, one of the surfaces of each pair being concave opposed to and surrounding the other which is convex; a pair of axially spaced, substantially rigid, sealing rings bridging the said intervals and conforming to the said conoidal surfaces which define the intervals, the surfaces of each pair being so related that the concave conoidal surface conforms substantially to an imaginary surface generated by the periphery of the sealing ring when the ring, while encircling the convex conoidal surface, is forced toward the base thereof; and means defining a passageway for admitting fluid under positive pressure between the said spaced sealing rings.

2. A joint as defined by claim 1 in which the last-mentioned means is located in the closure member.

3. A joint as defined by claim 1, in which one of each pair of related sealing surfaces is a right circular conical surface.

4. A joint as defined by claim 1, in which each of the said surfaces is a right circular conical surface.

References Cited in the file of this patent

UNITED STATES PATENTS

| 1,567,813 | Oleson | Dec. 29, 1925 |
| 2,348,293 | Hamer | May 9, 1944 |
| 2,687,229 | Laurent | Aug. 24, 1954 |